United States Patent
Tscherbner

(10) Patent No.: US 8,322,790 B2
(45) Date of Patent: Dec. 4, 2012

(54) SEAT ASSEMBLY HAVING A MULTI-POSITION HEAD RESTRAINT ASSEMBLY

(75) Inventor: Achim Tscherbner, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 334 days.

(21) Appl. No.: 12/710,387

(22) Filed: Feb. 23, 2010

(65) Prior Publication Data

US 2010/0259087 A1 Oct. 14, 2010

Related U.S. Application Data

(60) Provisional application No. 61/167,645, filed on Apr. 8, 2009.

(51) Int. Cl.
*A47C 7/36* (2006.01)
(52) U.S. Cl. .......... 297/408; 297/410; 297/220
(58) Field of Classification Search .......... 297/408, 297/404, 410, 220
See application file for complete search history.

(56) References Cited

U.S. PATENT DOCUMENTS

| | | | | |
|---|---|---|---|---|
| 3,537,749 A | * | 11/1970 | Putsch et al. | 297/408 |
| 3,586,366 A | * | 6/1971 | Patrick | 297/391 |
| 3,948,562 A | | 4/1976 | Grabner et al. | |
| 4,113,310 A | * | 9/1978 | Kapanka | 297/408 |
| 4,844,544 A | * | 7/1989 | Ochiai | 297/408 |
| 4,861,107 A | | 8/1989 | Vidwans et al. | |
| 5,236,245 A | * | 8/1993 | Harrell | 297/408 |
| 5,236,246 A | * | 8/1993 | Harrell | 297/408 |
| 5,238,295 A | * | 8/1993 | Harrell | 297/408 |
| 5,378,043 A | | 1/1995 | Viano et al. | |
| 5,683,141 A | * | 11/1997 | Wakamatsu et al. | 297/408 |
| 5,820,222 A | * | 10/1998 | De Filippo | 297/452.58 |
| 5,906,414 A | | 5/1999 | Rus | |
| 6,022,078 A | * | 2/2000 | Chang | 297/391 |
| 6,149,233 A | * | 11/2000 | Takei et al. | 297/220 |
| 6,270,161 B1 | * | 8/2001 | De Filippo | 297/410 |
| 6,604,788 B1 | | 8/2003 | Humer | |
| 6,779,839 B2 | * | 8/2004 | Andreasson et al. | 297/61 |

(Continued)

FOREIGN PATENT DOCUMENTS

DE 102007061938 A1 7/2008

(Continued)

OTHER PUBLICATIONS

German Patent & Trademark Office, Office Action for the corresponding German Patent Application No. 10 2010 003 664.1 mailed Jul. 8, 2011.

*Primary Examiner* — David Dunn
*Assistant Examiner* — David E Allred
(74) *Attorney, Agent, or Firm* — Brooks Kushman P.C.

(57) ABSTRACT

A seat assembly having a seat back, a support post extending from the seat back, and a headrest pivotally disposed on the support post. The headrest has a lower headrest portion, an upper headrest portion extending from the lower headrest portion, and a hinge clip that pivotally couples the headrest to the support post. The headrest is inhibited from pivoting about an axis of rotation in a first rotational direction when the lower headrest portion engages the support post.

20 Claims, 4 Drawing Sheets

U.S. PATENT DOCUMENTS

| | | |
|---|---|---|
| 6,893,095 B2 | 5/2005 | Schambre et al. |
| 2001/0004167 A1 * | 6/2001 | Takeda et al. ................. 297/408 |
| 2005/0168038 A1 | 8/2005 | Kubo |
| 2007/0057559 A1 * | 3/2007 | Miyahara et al. ............. 297/397 |
| 2008/0203791 A1 * | 8/2008 | Hennig et al. ................. 297/220 |
| 2008/0277989 A1 * | 11/2008 | Yamane et al. ............... 297/408 |
| 2010/0001570 A1 * | 1/2010 | Sayama ........................ 297/410 |
| 2010/0283307 A1 * | 11/2010 | Fujita ............................ 297/408 |

FOREIGN PATENT DOCUMENTS

| | | | |
|---|---|---|---|
| EP | 307214 A2 | * | 3/1989 |
| GB | 2240920 A | * | 8/1991 |

* cited by examiner

US 8,322,790 B2

SEAT ASSEMBLY HAVING A MULTI-POSITION HEAD RESTRAINT ASSEMBLY

CROSS-REFERENCE TO RELATED APPLICATIONS

This application claims the benefit of U.S. provisional application Ser. No. 61/167,645 filed Apr. 8, 2009.

BACKGROUND OF THE INVENTION

Field of the Invention

The present invention relates to a seat assembly having a multi-position head restraint assembly.

SUMMARY OF THE INVENTION

In at least one embodiment, a seat assembly is provided. The seat assembly includes a seat back, a support post extending from the seat back, and a headrest pivotally disposed on the support post. The headrest has a lower headrest portion, an upper headrest portion extending from the lower headrest portion, and a hinge clip that pivotally couples the headrest to the support post. The headrest is inhibited from pivoting about an axis of rotation in a first rotational direction when the lower headrest portion engages the support post.

In at least one embodiment, a seat assembly is provided. The seat assembly includes a seat back, a support post moveably disposed on the seat back, and a headrest disposed on the support post and configured to rotate about an axis of rotation. The headrest includes a support plate, a hinge clip, and a biasing member. The support plate has an upper plate portion that has a support post opening through which the support post extends. The hinge clip pivotally couples the support plate to the support post. The biasing member is disposed on the support post and biases the headrest to rotate about the axis of rotation away from the support post.

In at least one embodiment, a seat assembly is provided. The seat assembly includes a seat back, a support post moveably disposed on the seat back and a headrest. The headrest is pivotally disposed on the support post and includes a trim cover, a first cushion disposed adjacent to the trim cover, a second cushion disposed adjacent to the first cushion, a support plate, and a hinge clip. The support plate is disposed adjacent to the second cushion and has first and second support post openings that are spaced apart from each other. The hinge clip is disposed on the support plate between the first and second support post openings and permits the headrest to pivot about an axis of rotation. The first cushion is made of a different material than that of the second cushion.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
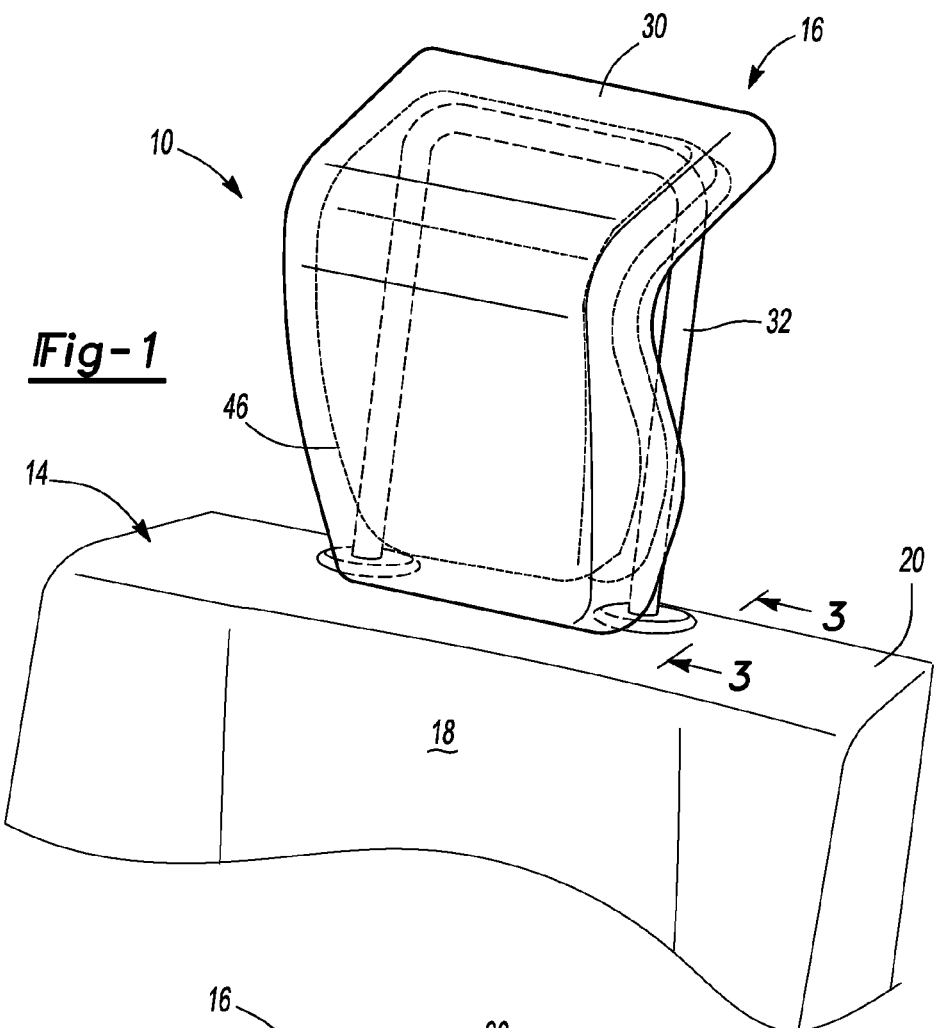
FIG. 1 is a perspective view of a seat assembly having a head restraint assembly in a first position.
Figure 2:
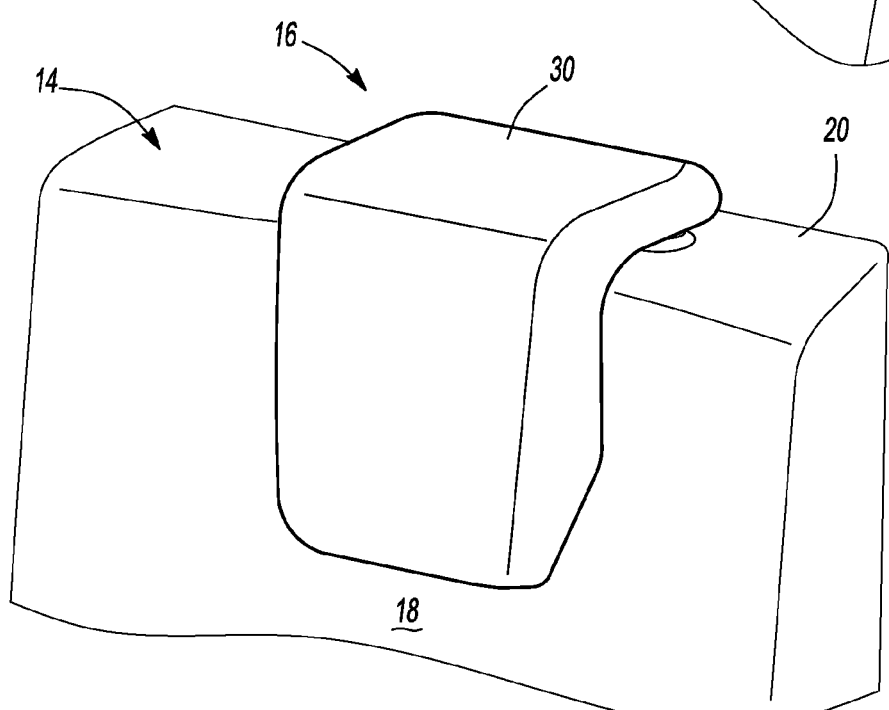
FIG. 2 is a perspective view of the seat assembly with the head restraint in a second position.
Figure 3:
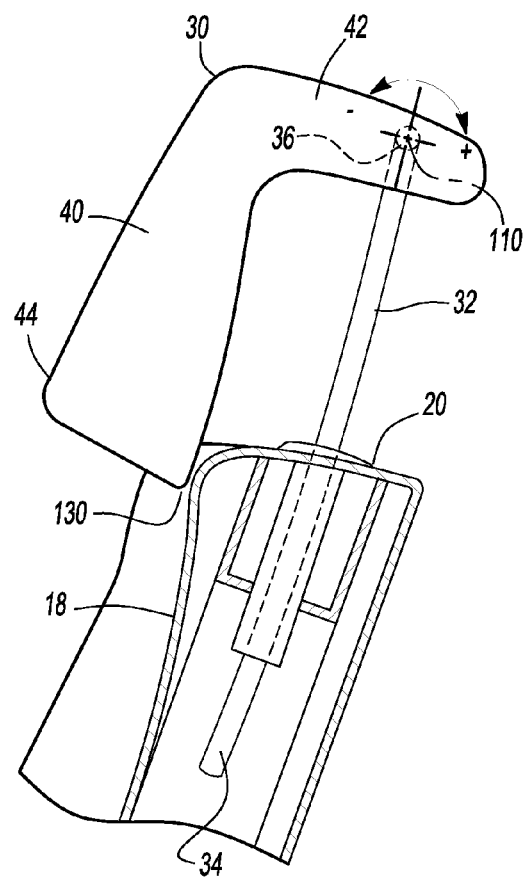
FIG. 3 is a fragmentary section view of the seat assembly along section line 3-3 in FIG. 1 with the head restraint assembly in a third position.

Referring to FIGS. 1-3, an exemplary seat assembly 10 is shown. The seat assembly 10 may be configured for use in a vehicle, such as a motor vehicle like a car or truck. In at least one embodiment, the seat assembly 10 may be provided as a rear seat that is disposed behind a first seating row in a vehicle.

The seat assembly 10 may include a seat bottom and a seat back 14. The seat bottom may be configured to be mounted on a support surface, such as a floor pan of a vehicle. The seat back 14 may be configured to pivot with respect to the seat bottom and may include a head restraint assembly 16, a front surface 18, and a top surface 20. The front surface 18 may provide a portion of a seating surface for a seat occupant. The top surface 20 may be disposed proximate the front surface 18 and may be located at the top of the seat back 14.

Referring to FIGS. 1-4, an embodiment of the head restraint assembly 16 is shown in more detail. The head restraint assembly 16 may include a headrest 30 and one or more support posts 32. The headrest 30 may be moveably or pivotally disposed on the support posts 32 as will be described in more detail below. The support posts 32 may be disposed on the seat back 14 may be made of any suitable material or materials, such as a metal or metal alloy. The support posts 32 may include a lower portion 34 and an upper portion 36.

The lower portion 34 may extend through the top surface 20 of the seat back 14. The lower portion 34 may have a tubular configuration and may have a linear or non-linear configuration in one or more embodiments. The lower portion 34 may also move with respect to the seat back 14. For instance, the lower portion 34 may be disposed in a guide sleeve that is disposed on the frame of the seat back 14. The guide sleeve may be configured to selectively permit or inhibit movement of the support post 32. As such, the support post 32 may move through the guide sleeve to position the headrest 30 in a first direction that generally extends toward or away from a top surface 20 of the seat back 14. Movement of the head restraint 16 in the first direction may occur independently of pivotal movement of the headrest 30 as will be discussed in more detail below.

The upper portion 36 may or may not be coaxially disposed with the lower portion 34. In at least one embodiment, the upper portion 36 may be generally U-shaped such that the upper portion 36 connects multiple lower portions 34. The upper portion 36 may include an engagement feature 38 that may extend from an exterior surface. The engagement feature 38 may be configured as a pin and may have any suitable configuration.

Figure 4:
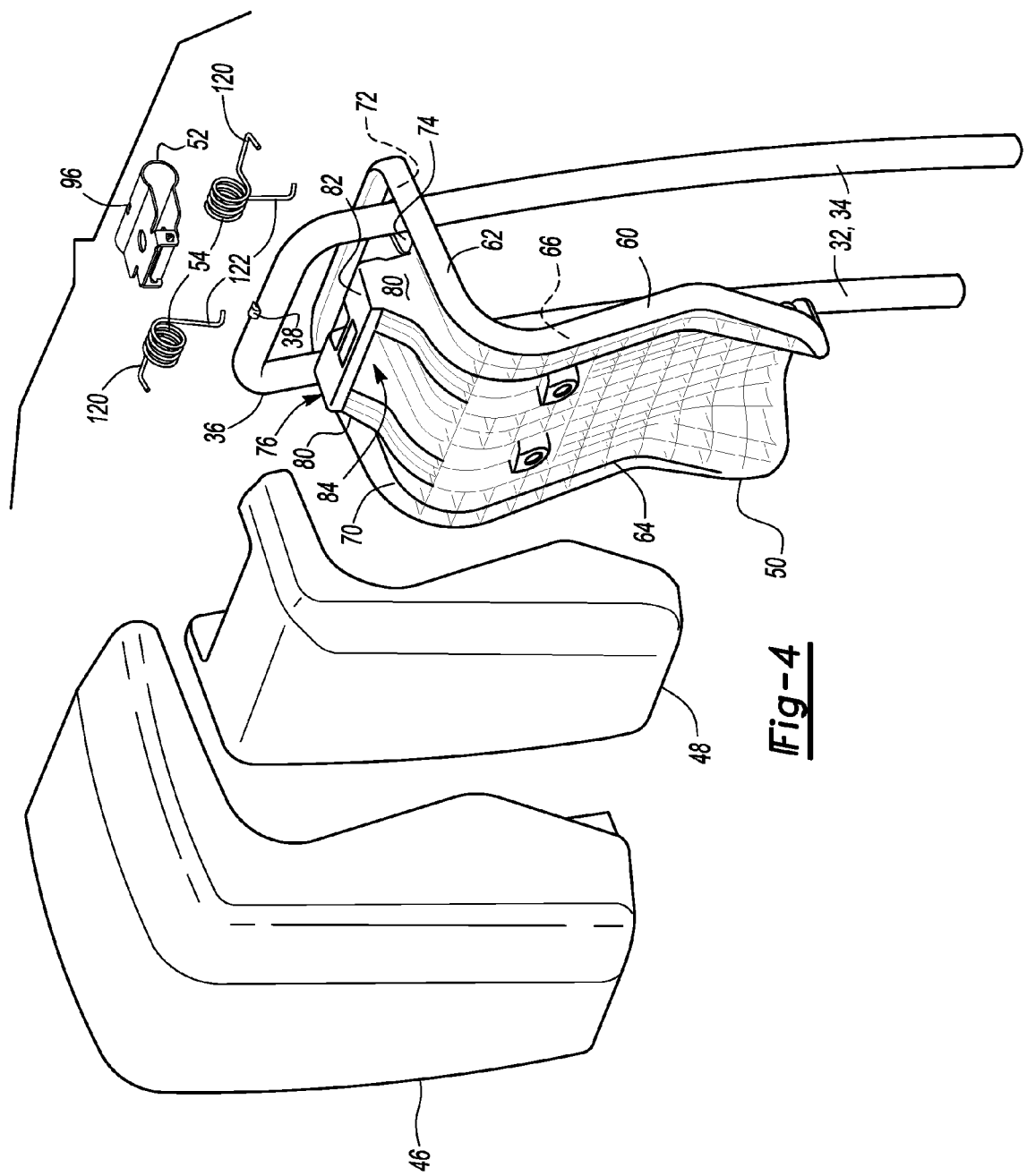
FIG. 4 is an exploded view of a portion of the head restraint assembly.

The headrest 30 may be configured to support the head of an occupant of the seat assembly 10. The headrest 30 may include a lower headrest portion 40, an upper headrest portion 42, a trim cover 44, a first cushion 46, a second cushion 48, a support plate 50, a hinge clip 52, and one or more biasing members 54. In FIG. 4, the headrest 30 is shown with the trim cover 44 removed to more clearly illustrate the other components.

The lower headrest portion 40 may be detached from the seat back 14 and the support post 32. The lower headrest portion 40 may extend in a general vertical direction and have a free end. The upper headrest portion 42 may extend at an angle from the lower headrest portion 40. For instance, the upper headrest portion 42 may extend generally perpendicular from the lower headrest portion 40 and away from the front surface 18 of the seat back 14.

The trim cover 44 may cover at least a portion of a visible exterior surface of the headrest 30. The trim cover 44 may be made of any suitable material or materials, such as a fabric, vinyl, leather, or the like. The trim cover 44 may be mounted to the support plate 50. For instance, the trim cover 44 may include one or more trim cover mounting features that may be disposed near one or more edges of the trim cover 44 and that may engage or be received by the support plate 50 as will be discussed in more detail below. In at least one embodiment, the trim cover mounting features may have a male configuration and may be configured as an enlarged bead that may be stitched or otherwise attached to the trim cover 44.

The first cushion 46 may be disposed between the trim cover 44 and the second cushion 48. The first cushion 46 may be made of any suitable material, such as a polyurethane foam. The first cushion 46 may be provided as a separate component that is installed on the headrest 30 or may be provided by a foam-in-place manufacturing process in which foam may be injected inside the trim cover 44.

The second cushion 48 may be disposed between the first cushion 46 and the support plate 50. The second cushion 48 may be made of a different material than the first cushion 46. For instance, the second cushion 48 may be made of an expanded polypropylene (EPP) material. The EPP material may help provide a desired radius of curvature to meet government regulatory requirements and to provide improved support for a seat occupant. The second cushion 48 may be molded to the support plate 50 or provided as a separate component.

The support plate 50 may act as a structural member that receives and distributes load forces imparted to the headrest 30. The support plate 50 may be made of any suitable material or materials, such as a polymeric material that may be injection molded. In at least one embodiment, the support plate 50 may include a lower plate portion 60 and an upper plate portion 62.

Figure 5:
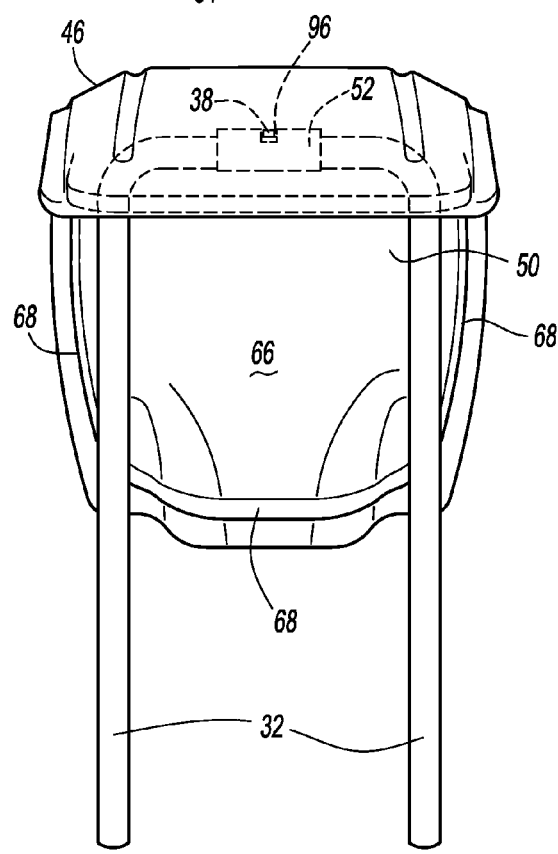
FIG. 5 is a back side view of a portion of the head restraint assembly.

Referring to FIGS. 4 and 5, the lower plate portion 60 may extend in a generally vertical direction and may have a free end. The lower plate portion 60 may include a first surface 64 disposed proximate the second cushion 48 and a second surface 66 disposed opposite the first surface 64. A trim channel 68 may be provided on the second surface 66 to facilitate mounting of the trim cover 44. In at least one embodiment, the trim channel 68 may be configured as a groove. The trim channel 68 may also extend onto the upper plate portion 62 and may be configured as a ring such that a portion of the lower plate portion 60 and/or upper plate portion 62 may be exposed and not covered by the trim cover 44.

The upper plate portion 62 may extend from an end of the lower plate portion 60 and generally away from the head of a seat occupant and toward the support post 32. The upper plate portion 62 may be integrally formed with the lower plate portion 60. The upper plate portion 62 may include an upper surface 70, a lower surface 72 disposed opposite the upper surface 70, one or more support post openings 74 and a mounting portion 76.

The support post opening 74 may be configured to receive the support post 32. The support post opening 74 may have any suitable configuration. In the embodiment shown, two support post openings 74 are provided near corners of the upper plate portion 62. Each support post opening 74 may be configured as a through hole that extends from the upper surface 70 to the lower surface 72. In addition, each support post opening 74 may be configured as an elongated slot that is disposed around the upper portion 36 of the support post 32. The support post opening 74 may be elongated in a direction extending toward the lower plate potion 60 or toward the front of the headrest 30. As such, the support post opening 74 may provide space for the support plate 50 to pivot with respect to the support post 32. The support post 32 may engage one or more surfaces that define the support post opening 74 to limit pivotal movement of the headrest 30 as will be discussed in more detail below.

The mounting portion 76 may facilitate mounting of the hinge clip 52 to the support plate 50. The mounting portion 76 may extend from the upper surface 70 of the upper plate portion 62. In at least one embodiment, the mounting portion 76 may include one or more upright portions 80 that extend from the upper surface 70 and a connecting portion 82 that extends between the upright portions 80. As such, the upper surface 70, upright portions 80, and connecting portion 82 may cooperate to at least partially define a hinge clip opening 84.

Figure 7:
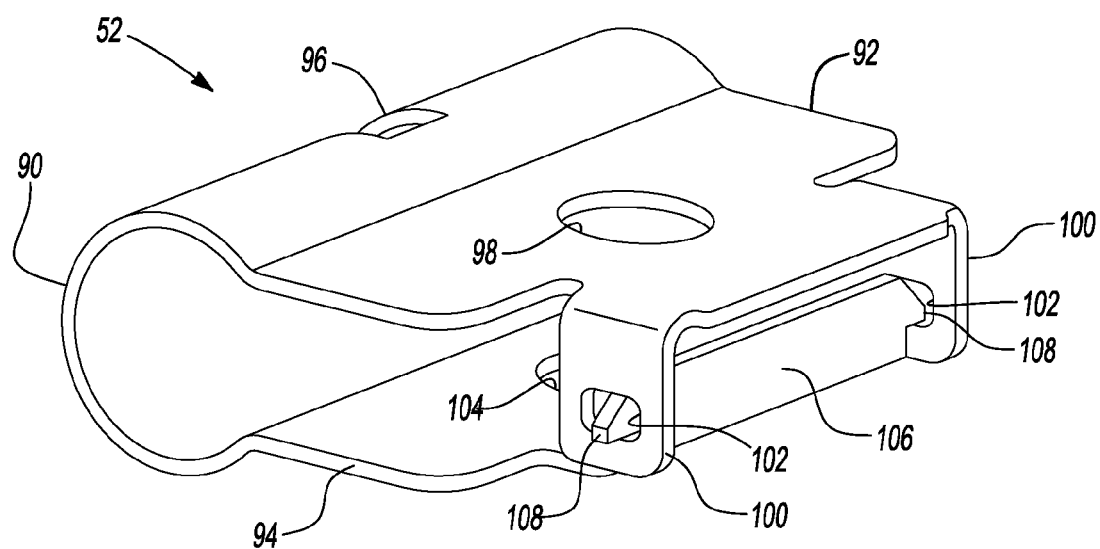
FIG. 7 is a perspective view of a hinge clip.

Referring to FIG. 7, an embodiment of the hinge clip 52 is shown in more detail. The hinge clip 52 may include a curved wall 90, a first wall 92, and a second wall 94. The hinge clip 52 may be made of any suitable material, such as a metal or metal alloy.

The curved wall 90 may engage and wrap partially around the support post 32. The curved wall 90 may include a slot 96 that receives the engagement feature 38 on the upper portion 36 of the support post 32.

First and second walls 92, 94 may extend from opposing ends of the curved wall 90. The first wall 92 may include a first mounting hole 98 and one or more flanges 100 that extend toward the second wall 94. The flanges 100 may extend from opposite surfaces of the first wall 92. Each flange 100 may have a flange opening 102.

The second wall 94 may include a second mounting hole 104 that may be coaxially aligned with the first mounting hole 98. The second wall 94 may also include an end portion 106 that extends toward the first wall 92. The end portion 106 may have one or more barbs 108 disposed at opposite ends that may extend into the flange openings 102 to secure the first and second walls 92, 94 together and to squeeze the curved wall 90 against the support post 32.

The hinge clip 52 may be coupled to the support plate 50 in any suitable manner. For instance, the hinge clip 52 may be mounted to the mounting portion 76. In at least one embodiment, the hinge clip 52 may be mounted to the connecting portion 82 such that the first wall 92 may be disposed along a first surface of the connecting portion 82 and the second wall 94 may be disposed along a second surface of the connecting portion 82 and extend into the hinge clip opening 84. Alternatively, the hinge clip 52 may be disposed along one surface of the connecting portion 82 rather than opposing surfaces in one or more embodiments. The hinge clip 52 may also be attached to the connecting portion 82 with a fastener that may extend through the first and/or second mounting holes 98, 104.

The hinge clip 52 may be configured to permit the headrest 30 to pivot with respect to the support post 32 about an axis of rotation 110 when sufficient force is applied, yet inhibit movement of the headrest 30 when sufficient force is not applied. As such, the headrest 30 may remain in position unless sufficient force is applied to overcome the frictional resistance provided by the hinge clip 52. In addition, the engagement feature 38 on the support post 32 may cooperate with the slot 96 on the curved wall 90 of the hinge clip 52 to limit the range of pivotal motion of the headrest 30. For instance, the engagement feature 38 may engage one end of the slot 96 to inhibit pivotal movement about the axis of rotation 110 in a first direction and may engage an opposite end of the slot 96 to inhibit pivotal movement about the axis of rotation 110 in a second direction.

Figure 6:
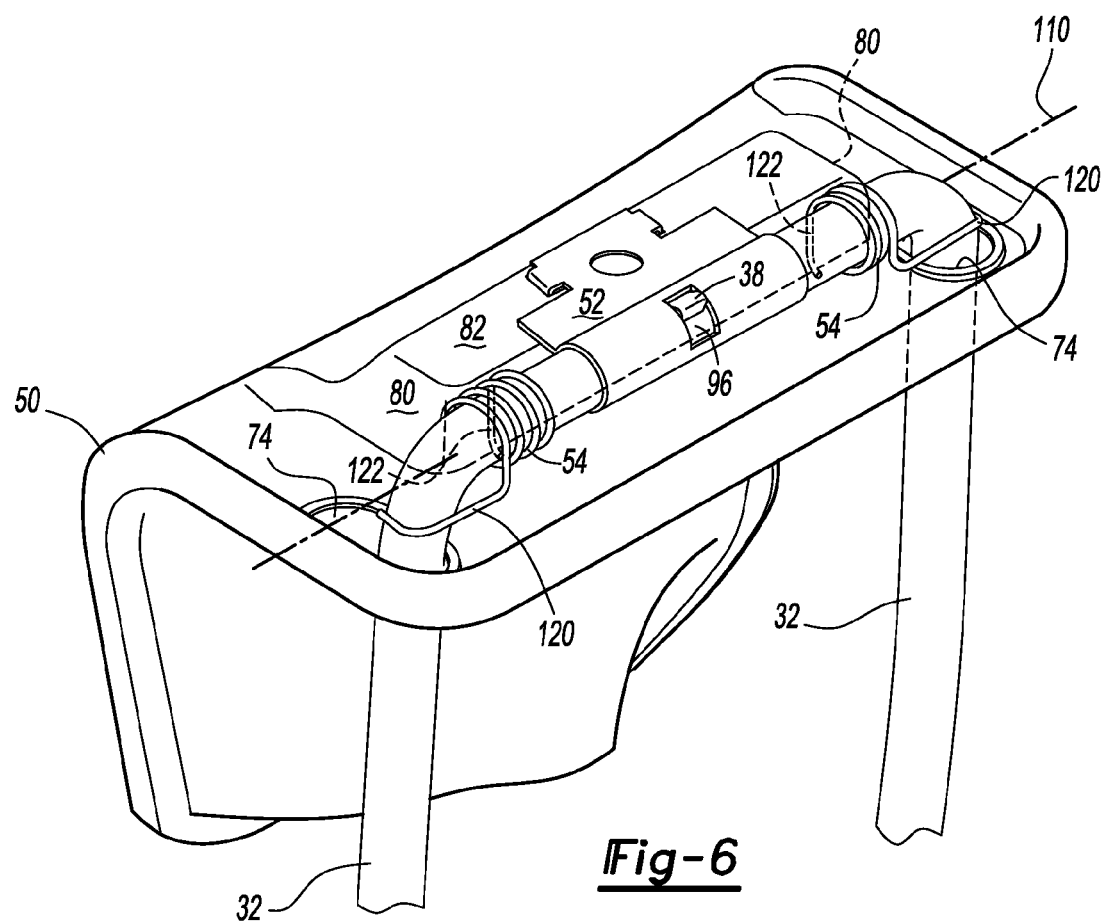
FIG. 6 is a perspective view of a portion of the head restraint assembly.

Referring to FIGS. 4 and 6, the biasing member 54 is shown in more detail. The biasing member 54 may exert a biasing force that biases the headrest 30 toward the support post 32. The biasing member 54 may have any suitable configuration. For instance, the biasing member 54 may be configured as a spring, such as a coil torsion spring, that may be disposed around the support post 32. In the embodiment shown, the biasing member 54 has a first end 120 and a second end 122. The first end 120 may engage a surface of the support post 32, such as an exterior surface of the upper portion 36 of the support post 32. The second end 122 may be disposed opposite the first end 120. The second end 122 may engage the support plate 50. For example, the second end 122 may engage the mounting portion 76 of the upper plate portion 62. Alternatively, the second end 122 may be disposed in a hole in the support plate 50 and extend toward or engage the lower surface 72 of the upper plate portion 62. In FIG. 6, two biasing members 54 are shown on opposite sides of the hinge clip 52. Each biasing member 54 may be disposed between the hinge clip 52 and a corresponding support post opening 74.

Referring again to FIGS. 1-3, the head restraint assembly 16 is illustrated in multiple positions. The head restraint assembly 16 may move between multiple positions and in multiple directions or manners. For instance, the head restraint assembly 16 may move in a first manner between a fully retracted position and a fully extended position. In the fully retracted position illustrated in FIG. 2, the upper plate portion 62 of the headrest 30 may be positioned proximate the top surface 20 of the seat back 14. In the fully extended position illustrated in FIG. 3, the upper plate portion 62 of the headrest 30 may be moved away and spaced apart from the top surface 20 of the seat back 14. The head restraint assembly 16 may be selectively positionable in one or more intermediate positions disposed between the fully retracted and fully extended positions due to operation of the guide sleeve as previously discussed.

The head restraint assembly 16 may also be configured to move in a second manner independent of movement in the first manner. Movement in the second manner may occur when the headrest 30 pivots about the axis of rotation 110. The headrest 30 may pivot about the axis of rotation 110 between a negative rotational position and a positive rotational position.

In the negative rotational direction illustrated in FIG. 1, the headrest 30 may be rotated about the axis of rotation 110 in a first rotational direction, which is counterclockwise when viewed from the right side in FIG. 1, to move the lower portion 34 of the headrest 30 away from the head of a seat occupant and generally toward the seat back 14 and/or support post 32. The negative rotational position may be the maximum amount that the headrest can rotate in the first rotational direction. For instance, the negative rotational position may be approximately 25 degrees from a nominal rotational position shown in FIG. 2. The free end disposed along the lower portion 34 of headrest 30 may be disposed proximate the support post 32 when the head restraint assembly 16 is in the negative rotational position and in the fully extended position as shown in FIG. 1. In at least one embodiment, rotation in the first rotational direction may be inhibited when the lower portion 34 engages the support post 32.

In the positive rotational position illustrated in FIG. 3, the headrest 30 may be rotated about the axis of rotation 110 in a second rotational direction, which is clockwise in FIG. 3, toward the head of a seat occupant and away from the seat back 14 and/or support post 32. The positive rotational position may be the maximum amount that the headrest 30 can rotate in the second rotational direction. The positive rotational position may be set at a greater angle with respect to the nominal rotational position than the negative rotational position. For instance, the positive rotational position may be approximately 5 degrees from a nominal rotational position shown in FIG. 2. The free end disposed along the lower portion 34 of headrest 30 may be spaced apart by a gap 130 from the seat back 14 when the head restraint assembly 16 is in the positive rotational position and in the fully extended position as shown in FIG. 3. In at least one embodiment, rotation in the second rotational direction may be inhibited when the engagement feature 36 engages an end of the slot 96 of the hinge clip 52. In addition, in the position shown in FIG. 2, the position of the headrest 30 may force a seat occupant to adjust his torso position forward by more than ten degrees to meet regulatory requirements.

The head restraint assembly 16 may be selectively positionable in one or more intermediate rotational or angular positions disposed between the negative and positive rotational positions due to operation of the hinge clip 52. For instance, the head restraint assembly 16 may be positioned in a nominal rotational position shown in FIG. 2, in which the lower plate portion 60 of the headrest 30 may be substantially aligned with the front surface 18 of the seat back 14. In addition, the headrest 30 may be inhibited from pivoting about the axis of rotation 110 when in the fully retracted position due to engagement of the lower and upper portions 34, 36 of the headrest 30 with the front and top surfaces 18, 20 of the seat back 14, respectively.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a seat back;
   a support post extending from the seat back; and
   a headrest pivotally disposed on the support post, the headrest including:
   a lower headrest portion;
   an upper headrest portion extending from the lower headrest portion;
   a hinge clip that pivotally couples the headrest to the support post; and a first biasing member that biases the headrest in a first rotational direction;
   wherein the headrest is inhibited from pivoting about an axis of rotation in the first rotational direction when the lower headrest portion engages the support post and wherein the lower headrest portion is urged by the first biasing member such that the lower headrest portion engages the support post when the upper headrest portion is spaced apart from the seat back.

2. The seat assembly of claim 1 wherein the support post further comprises an engagement feature and the hinge clip further comprises a slot, wherein the headrest is inhibited from pivoting about the axis of rotation in a second rotational direction disposed opposite the first rotational direction when the engagement feature engages an end of the slot.

3. The seat assembly of claim 2 wherein the headrest is permitted to pivot in the second rotational direction when the headrest is not in a fully retracted position in which the upper headrest portion engages a top surface of the seat back.

4. The seat assembly of claim 1 wherein the headrest has a support plate that has a first support post opening that receives the support post and wherein the first biasing member is disposed on the support post between the hinge clip and the first support post opening.

5. The seat assembly of claim 1 wherein the headrest is configured to move between a fully retracted position in which the upper headrest portion engages a top surface of the seat back and a fully extended position in which the upper headrest portion is spaced apart from the seat back.

6. The seat assembly of claim 5 wherein the lower headrest portion is spaced apart from the seat back when the headrest is in the fully extended position.

7. The seat assembly of claim 5 wherein rotation of the headrest about the axis of rotation occurs independently from movement of the headrest between the fully retracted and fully extended positions.

8. The seat assembly of claim 5 wherein the upper and lower headrest portions engage the top and front surfaces of the seat back, respectively, when the headrest is in the fully retracted position.

9. A seat assembly comprising:
a seat back;
a support post moveably disposed on the seat back; and
a headrest disposed on the support post and configured to rotate about an axis of rotation, the headrest including:
a support plate having an upper plate portion that has a support post opening through which the support post extends, an upper surface that faces away from the seat back, a pair of upright portions extending from the upper surface, and a connecting portion extending between the pair of upright portions, wherein the upper surface, pair of upright portions, and connecting portion define a hinge clip opening;
a hinge clip that extends into the hinge clip opening to pivotally couple the support plate to the support post; and
a biasing member disposed on the support post that biases the headrest to rotate about the axis of rotation toward the support post.

10. The seat assembly of claim 9 wherein the biasing member is a spring that is disposed around the support post, the biasing member having a first end that engages the support post and a second end disposed opposite the support post that engages the upper plate portion of the support plate.

11. The seat assembly of claim 9 wherein the biasing member is spaced apart from the hinge clip.

12. The seat assembly of claim 9 wherein the hinge clip includes first and second walls that engage opposing surfaces of the connecting portion.

13. The seat assembly of claim 9 wherein the support plate has a lower plate portion extending from the upper plate portion, wherein the lower plate portion includes a trim channel that facilitates mounting of a trim cover that covers an exterior surface of the headrest.

14. The seat assembly of claim 13 further comprising a first cushion disposed adjacent to the trim cover and spaced apart from the support plate and a second cushion disposed between the first cushion and the support plate.

15. The seat assembly of claim 14 wherein the first cushion and the second cushion are made of different materials.

16. A seat assembly comprising:
a seat back;
a support post moveably disposed on the seat back; and
a headrest pivotally disposed on the support post, the headrest including:
a trim cover;
a first cushion disposed adjacent to the trim cover;
a second cushion disposed adjacent to the first cushion;
a support plate disposed adjacent to the second cushion, the support plate having first and second support post openings that are spaced apart from each other;
a hinge clip disposed on the support plate between the first and second support post openings that permits the headrest to pivot about an axis of rotation; and
a first biasing member disposed on the support post between the first support post opening and the hinge clip and a second biasing member disposed on the support post between the second support post opening and the hinge clip, wherein the first and second biasing members exert a biasing force against the support plate to rotate a lower portion of the headrest toward the support post.

17. The seat assembly of claim 16 wherein the first cushion is made of a different material than that of the second cushion.

18. The seat assembly of claim 16 wherein the support plate has an upper plate portion and a lower plate portion extending at an angle from the upper plate portion, wherein the first and second support post openings are disposed on the upper plate portion and are configured as slots that are elongated in a direction extending toward a lower plate portion to permit the headrest to rotate about the axis of rotation.

19. The seat assembly of claim 16 wherein the headrest includes a lower portion that is aligned with a front surface of the seat back when the headrest is in a nominal rotational position.

20. The seat assembly of claim 19 wherein the headrest is configured to rotate about the axis of rotation between a negative rotational position and a positive rotational position, wherein a nominal rotational position is disposed between the negative and positive rotational positions, and wherein an angle of rotation between the nominal rotational position and the negative rotational position is greater than an angle of rotation between the nominal rotational position and the positive rotational position.

* * * * *